(12) United States Patent
Lu et al.

(10) Patent No.: US 8,370,544 B2
(45) Date of Patent: Feb. 5, 2013

(54) DATA STORAGE SYSTEM WITH COMPRESSION/DECOMPRESSION

(75) Inventors: Guangming Lu, Irvine, CA (US); Mark Moshayedi, Newport Coast, CA (US)

(73) Assignee: STEC, Inc., Santa Ana, CA (US)

( * ) Notice: Subject to any disclaimer, the term of this patent is extended or adjusted under 35 U.S.C. 154(b) by 0 days.

(21) Appl. No.: 12/842,919

(22) Filed: Jul. 23, 2010

(65) Prior Publication Data

US 2012/0260009 A1      Oct. 11, 2012

Related U.S. Application Data

(60) Provisional application No. 61/228,130, filed on Jul. 23, 2009.

(51) Int. Cl.
*G06F 13/12* (2006.01)

(52) U.S. Cl. .............................. 710/52; 710/68; 709/247

(58) Field of Classification Search ..................... 710/68; 709/247

See application file for complete search history.

(56) References Cited

U.S. PATENT DOCUMENTS

| | | | | |
|---|---|---|---|---|
| 4,929,946 | A * | 5/1990 | O'Brien et al. | 341/87 |
| 5,247,638 | A * | 9/1993 | O'Brien et al. | 710/68 |
| 2003/0079081 | A1 * | 4/2003 | Okada et al. | 711/113 |
| 2008/0244121 | A1 * | 10/2008 | Vogt | 710/68 |
| 2009/0248912 | A1 * | 10/2009 | Taguchi et al. | 710/30 |

OTHER PUBLICATIONS

Royals, On the Design and Implementation of a Lossless Data Compression and Decompression Chip, Sep. 1993, IEEE, pp. 1-6.*

* cited by examiner

*Primary Examiner* — Ernest Unelus
(74) *Attorney, Agent, or Firm* — McDermott Will & Emery LLP

(57) ABSTRACT

A data storage system includes a host interface configured to be coupled to a host device, to receive data from the host device, and to send data to the host device and a memory. The data storage system further includes a primary compression engine coupled to the host interface and to the memory, wherein the primary compression engine is configured to compress data received from the host device via the host interface and to store the compressed data in the memory, and wherein the primary compression engine is further configured to decompress compressed data stored in the memory prior to the decompressed data being sent to the host device via the host interface. The data storage system further includes a secondary compression engine coupled to the memory, wherein the secondary compression engine is configured to compress data stored in the memory and to store the compressed data back in the memory, and wherein the secondary compression engine is further configured to decompress compressed data stored in the memory and to store the decompressed data back in the memory. The data storage system further includes a non-volatile storage medium and a processor configured to transfer compressed data from the memory to the non-volatile storage medium in response to a write command received from the host device and to transfer compressed data from the non-volatile storage medium to the memory in response to a read command received from the host device.

21 Claims, 6 Drawing Sheets

DATA STORAGE SYSTEM WITH COMPRESSION/DECOMPRESSION

This application claims the benefit of U.S. Provisional Application No. 61/228,130, filed on Jul. 23, 2009, which is hereby incorporated by reference herein.

BACKGROUND

The subject application relates to data storage systems and, in particular, data storage systems using compression/decompression to store data.

Data storage systems are limited in capacity and performance. For example, solid state storage devices that utilize flash memory to store data are limited by the number of flash memory chips that can be incorporated into a single solid state storage device and the data capacity of the individual flash memory chips. In addition, flash memory chips are limited in the number of write operations that can be performed before data errors start to negatively impact performance. Developments in technology to increase the capacity of individual flash memory chips as well as the flash memory chip count in solid state storage devices struggle to keep pace with the increasing need for data storage. Furthermore, the increasing need to store more data runs contrary to the need to limit the number of write operations in order to maximize the lifespan of individual solid state storage devices.

SUMMARY

According to one aspect of the subject technology, a data storage system is described. The data storage system includes a host interface configured to be coupled to a host device, to receive data from the host device, and to send data to the host device and a memory. The data storage system further includes a primary compression engine coupled to the host interface and to the memory, wherein the primary compression engine is configured to compress data received from the host device via the host interface and to store the compressed data in the memory, and wherein the primary compression engine is further configured to decompress compressed data stored in the memory prior to the decompressed data being sent to the host device via the host interface. The data storage system further includes a secondary compression engine coupled to the memory, wherein the secondary compression engine is configured to compress data stored in the memory and to store the compressed data back in the memory, and wherein the secondary compression engine is further configured to decompress compressed data stored in the memory and to store the decompressed data back in the memory. The data storage system further includes a non-volatile storage medium and a processor configured to transfer compressed data from the memory to the non-volatile storage medium in response to a write command received from the host device and to transfer compressed data from the non-volatile storage medium to the memory in response to a read command received from the host device.

According to another aspect of the subject technology, a data storage controller is described. The data storage controller includes a host interface configured to be coupled to a host device, to receive data from the host device, and to send data to the host device, and a memory interface configured to be coupled to a memory. The data storage controller further includes a primary compression engine coupled to the host interface and to the memory interface, wherein the primary compression engine is configured to compress data received from the host device via the host interface and to store the compressed data in the memory via the memory interface, and wherein the primary compression engine is further configured to decompress compressed data received from the memory via the memory interface prior to the decompressed data being sent to the host device via the host interface. The data storage controller further includes a secondary compression engine coupled to the memory interface, wherein the secondary compression engine is configured to compress data received from the memory via the memory interface and to store the compressed data back in the memory via the memory interface, and wherein the secondary compression engine is further configured to decompress compressed data received from the memory via the memory interface and to store the decompressed data back in the memory via the memory interface. The data storage controller further includes a non-volatile storage medium interface and a processor configured to transfer compressed data from the memory via the memory interface to the non-volatile storage medium via the non-volatile storage medium interface in response to a write command received from the host device via the host interface and to transfer compressed data from the non-volatile storage medium via the non-volatile storage medium interface to the memory via the memory interface in response to a read command received from the host device via the host interface.

According to another aspect of the subject technology, a data storage system is described. The data storage system includes a host interface configured to be coupled to a host device, to receive data from the host device, and to send data to the host device, and a memory. A primary compression engine includes a plurality of compression sub-systems configured to compress respective logical units of data received from the host device via the host interface and to store the compressed data in the memory, a compression bypass buffer configured to store data received from the host device indicated not to be compressed, wherein the primary compression engine is configured to transfer data from the compression bypass buffer to the memory without passing the data through the plurality of compression sub-systems. The primary compression engine further includes a plurality of decompression sub-systems configured to decompress compressed data transferred from the memory and a decompression bypass buffer configured to store data transferred from the memory indicated as being uncompressed, wherein the host interface is configured to transfer data stored in the decompression bypass buffer to the host device without the data passing through the plurality of decompression sub-systems. A secondary compression engine is coupled to the memory, wherein the secondary compression engine is configured to compress data stored in the memory and to store the compressed data back in the memory, and wherein the secondary compression engine is further configured to decompress compressed data stored in the memory and to store the decompressed data back in the memory. The data storage system further includes a storage medium, and a processor configured to transfer compressed data from the memory to the non-volatile storage medium in response to a write command received from the host device and to transfer compressed data from the non-volatile storage medium to the memory in response to a read command received from the host device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
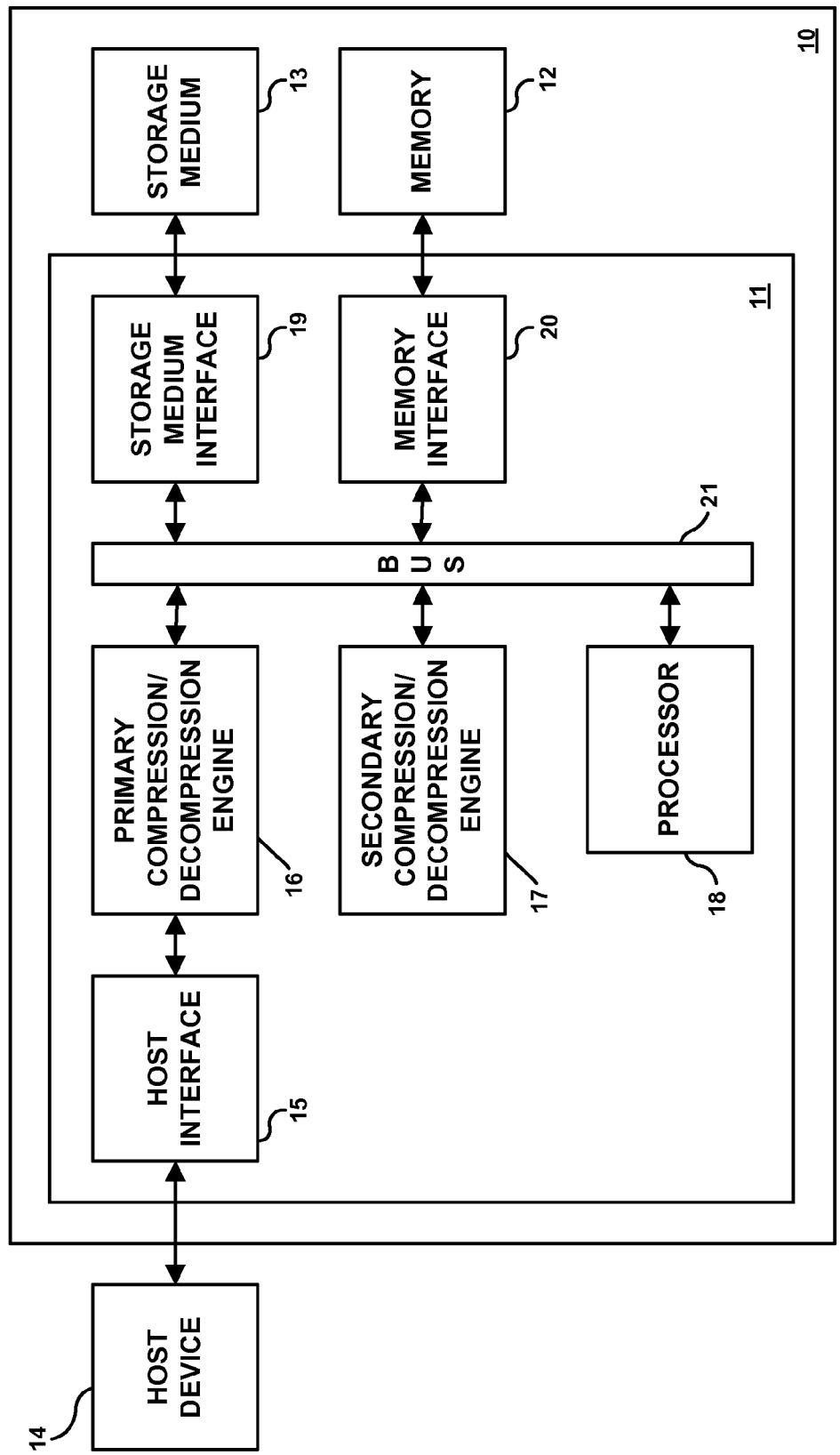
FIG. 1 is a block diagram illustrating components of a data storage system according to one aspect of the subject technology.

FIG. 1 is a block diagram illustrating components of a data storage system according to one aspect of the subject technology. As depicted in FIG. 1, data storage system 10 includes data storage controller 11, memory 12, and storage medium 13. Data storage controller 11 may use memory 12 for temporary storage of data and information used to manage data storage system 10. Data storage controller 11 is configured to store data received from host device 14 in storage medium 13 in response to a write command from host device 14. Data storage controller 11 is further configured to read data stored in storage medium 13 and transfer the read data to host device 14 in response to a read command from host device 14. As will be described in more detail below, data storage controller 11 is configured to compress data received from host device 14 prior to the data being stored in storage medium 13 and to decompress compressed data read from storage medium 13 prior to transferring the read data to host device 14. By compressing data stored within storage medium 13, the subject technology may reduce the number of program/erase operations performed on flash memory cells (storage medium 13) in a particular application environment. This reduction in program/erase operations could increase the flash memory cell endurance compared to the same application environment operating without compression.

Host device 14 represents any device configured to be coupled to data storage system 10 and to store data in data storage system 10. Host device 14 may be a computing system such as a personal computer, a server, a workstation, a laptop computer, etc. Alternatively, host device 14 may be an electronic device such as a digital camera, a digital audio player, a digital video recorder, etc.

Storage medium 13 represents a non-volatile storage medium for storing data. According to one aspect of the subject technology, storage medium 13 comprises flash memory, such as NAND flash memory. The flash memory may comprise a single flash memory device or chip, or may include multiple flash memory devices or chips arranged in multiple channels. The flash memory is not limited to any particular capacity or configuration. For example, the number of physical blocks, the number of physical pages per physical block, the number of sectors per physical page, and the size of the sectors may vary within the scope of the subject technology. Those skilled in the art will further recognize that the subject technology may be applied to storage media besides flash memory, such as magnetic disks.

Memory 12 represents volatile memory used to temporarily store data and information used to manage data storage system 10. According to one aspect of the subject technology, memory 12 is random access memory (RAM) such as double data rate (DDR) RAM. Other types of RAM also may be used to implement memory 12. Memory 12 may be implemented using a single RAM module or multiple RAM modules. While memory 12 is depicted as being distinct from data storage controller 11, those skilled in the art will recognize that memory 12 may be incorporated into data storage controller 11 without departing from the scope of the subject technology.

As further depicted in FIG. 1, data storage controller 11 includes host interface 15, primary compression/decompression engine 16, secondary compression/decompression engine 17, processor 18, storage medium interface 19, memory interface 20 and bus 21. Host interface 15 is configured to be coupled to host device 14, to receive data from host device 14 and to send data to host device 14. Primary compression/decompression engine 16 is coupled to host interface 14 and is configured to compress data received from host device 14 on the fly and to decompress data sent to host device 14 on the fly. Secondary compression/decompression engine 17 is configured to compress and decompress data associated with operations internal to data storage device 10, such as read-modify-write cycles used to manage data stored in flash memory. Processor 18 monitors and manages the operation of the components within data storage controller 11. Storage medium interface 19 is configured to be coupled to storage medium 13 for storing data in storage medium 13 and for reading data from storage medium 13. Memory interface 20 is configured to be coupled to memory 12 for storing data in memory 12 and for reading data from memory 12. Bus 21 is configured to facilitate the communication of data and control signals between the components of data storage controller 11. The operation of each of these components will be described in more detail below.

Host interface 15 may include both electrical and physical connections for coupling data storage system to host device 14. Host interface 15 is configured to communicate data, address, and control signals between host device 14 and data storage controller 11. Host interface 15 may be configured to implement a standard interface, such as Serial-Attached SCSI (SAS), Fiber Channel interface, PCI Express (PCIe), etc. Host interface 15 may be configured to implement only one interface. Alternatively, host interface 15 may be configured to implement multiple interfaces, which are individually selectable using a configuration parameter selected by a user or programmed at the time of assembly. Host interface 15 may include one or more buffers for buffering transmissions between host device 14 and data storage controller 11. Host interface 15 also may include one or more direct memory access (DMA) engines configured to transfer data between host device 14 and host interface 15 and/or between host interface 15 and primary compression/decompression engine 16.

Primary compression/decompression engine 16 is configured to compress data received from host device 14 via host interface 15 and to store the compressed data in memory 12 via memory interface 20. Primary compression/decompression engine 16 is further configured to decompress compressed data stored in memory 12 prior to the data being sent to host device 14 via host interface 15. Primary compression/decompression engine 16 includes a compression portion and a decompression portion. The compression portion will be described below with respect to FIG. 2 and the decompression portion will be described below with respect to FIG. 3.

Figure 2:
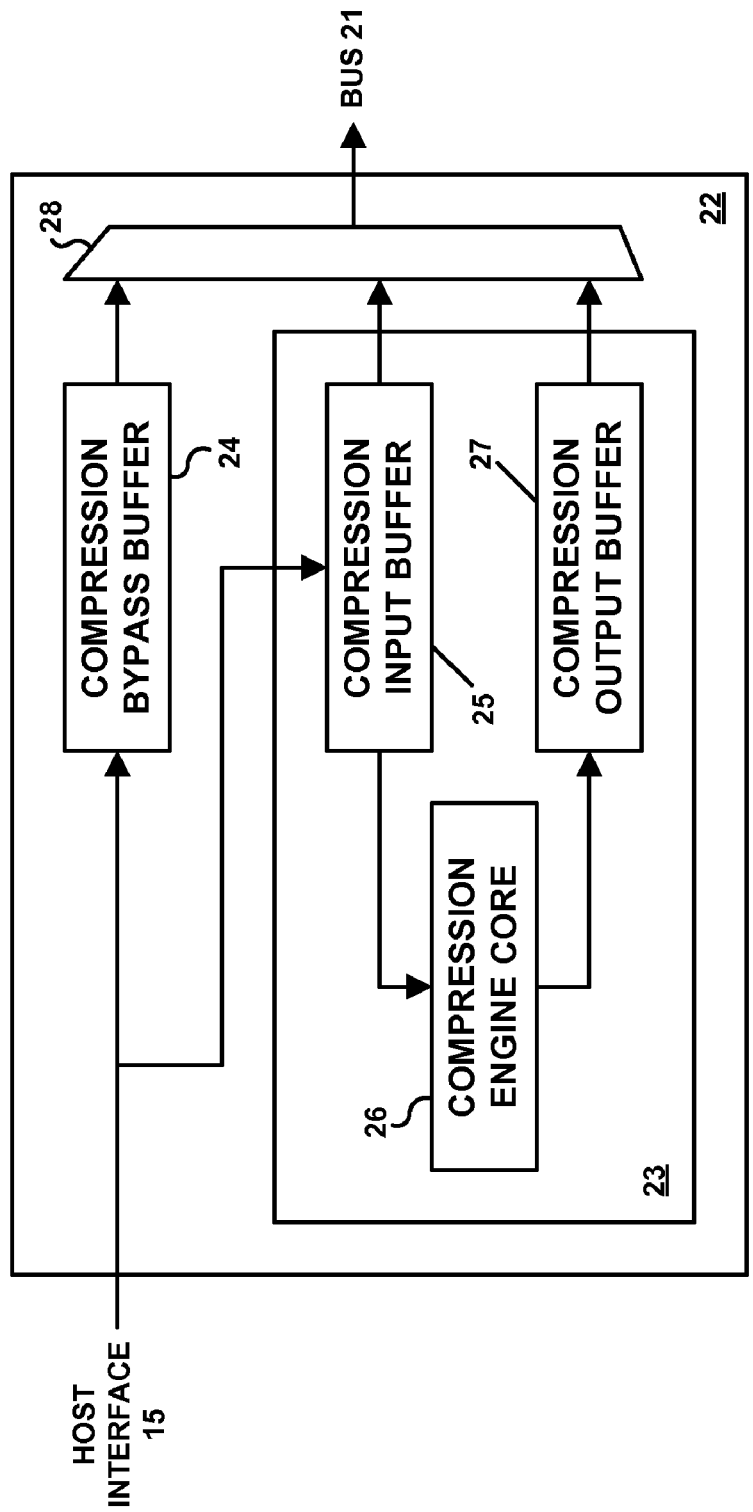
FIG. 2 is a block diagram illustrating components of the compression portion of a primary compression/decompression engine according to one aspect of the subject technology.

FIG. 2 is a block diagram illustrating components of the compression portion of primary compression/decompression engine 16 according to one aspect of the subject technology. Compression portion 22 includes compression sub-system 23 and compression bypass buffer 24. Compression sub-system 23 includes compression input buffer 25, compression engine core 26, and compression output buffer 27. Compression portion 22 also may include multiplexer 28 and/or one or more DMA engines (not shown) configured to transfer data from compression bypass buffer 24, compression input buffer 25, and/or compression output buffer 27 to memory 12.

Compression input buffer 25 is configured to store data received from host device 14 via host interface 15. Compression input buffer 25 may be a first-in/first-out (FIFO) buffer. Compression engine core 26 is configured to compress the data stored in compression input buffer 25 and store the compressed data in compression output buffer 27. Similar to compression input buffer 25, compression output buffer 27 may be a FIFO buffer. Compression output buffer 27 is configured to store the compressed data until it is stored in memory 12. Compression bypass buffer 24 is configured to store data received from host device 14 via host interface 15 that is intended to bypass compression sub-system 23 and therefore not be compressed prior to being stored in memory 12. Data that is stored in compression bypass buffer 24 may include command and/or control information received from host device 14, pre-compressed data, such as audio and video data compressed according to various industry standards, etc.

Compression system 22 may be configured to work on one logical block of data at a time. Accordingly, each of compression bypass buffer 24, compression input buffer 25, and compression output buffer 27 may have sufficient capacity to store at least one logical block of data. However, the subject technology does not require the capacity to be larger than one logical block of data. Each logical block of data may contain multiple sectors addressed by host device 14. For example, each logical block of data may include two, four, eight, sixteen, thirty-two, etc. sectors of data addressed by host device 14. Each sector addressed by host device 14 may contain 512 bytes, 520 bytes, 524 bytes, 528 bytes, etc.

FIG. 2 depicts compression portion 22 as containing one compression sub-system 23. The subject technology is not limited to this configuration. For example, compression portion 22 may include multiple compression sub-systems 23 each configured to compress respective data received from host device 14 via host interface 15. Multiple compression sub-systems 23 may be used to match the data bandwidth at which host interface 15 is capable of receiving data from host device 14. In this manner, compression system 22 is capable of compressing data received from host device 14 on-the-fly with little or no impact on the rate at which the data can be stored within data storage system 10.

FIG. 2 also depicts compression portion 22 as containing a single compression bypass buffer 24. The subject technology is not limited to this configuration. For example, compression portion 22 may include multiple compression bypass buffers 24 configured to receive respective data from host device via host interface 15 that bypasses compression sub-system 23.

Figure 3:
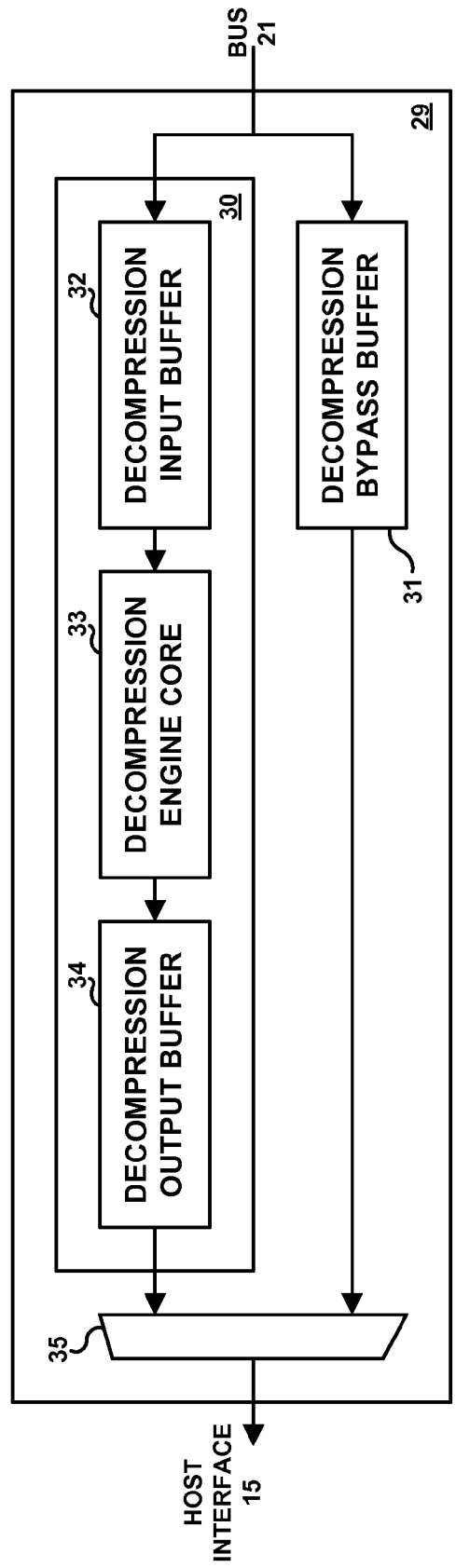
FIG. 3 is a block diagram illustrating components of the decompression portion of a primary compression/decompression engine according to one aspect of the subject technology.

FIG. 3 is a block diagram illustrating components of the decompression portion of primary compression/decompression engine 16 according to one aspect of the subject technology. Decompression portion 29 includes decompression sub-system 30 and decompression bypass buffer 31. Decompression sub-system 30 includes decompression input buffer 32, decompression engine core 33, and decompression output buffer 34. Decompression portion 29 also may include multiplexer 35 and/or one or more DMA engines (not shown) configured to transfer data from memory 12 to decompression bypass buffer 31 and/or decompression input buffer 32.

Decompression input buffer 32 is configured to store compressed data transferred from memory 12. Decompression input buffer 32 may be a first-in/first-out (FIFO) buffer. Decompression engine core 33 is configured to decompress the compressed data stored in decompression input buffer 32 and to store the decompressed data in decompression output buffer 34. Similar to decompression input buffer 32, decompression output buffer 34 may be a FIFO buffer. Decompression output buffer 34 is configured to store the decompressed data until it is transferred to host device 14 via host interface 15. Decompression bypass buffer 31 is configured to store data transferred from memory 12 that is intended to bypass decompression sub-system 29 and therefore not be decompressed prior to being transferred to host device 14. Data that is stored in decompression bypass buffer 31 may include command and/or control information communicated to host device 14, data that was initially received from host device 14 in a compressed format, such as audio and video data compressed according to various industry standards, etc.

Similar to compression system 22, decompression system 29 may be configured to work on one logical block of data at a time. Accordingly, each of decompression bypass buffer 31, decompression input buffer 32, and decompression output buffer 34 may have sufficient capacity to store at least one logical block of data. However, the subject technology does not require the capacity to be larger than one logical block of data. As discussed above, each logical block of data may contain multiple sectors addressed by host device 14. For example, each logical block of data may include two, four, eight, sixteen, thirty-two, etc. sectors of data addressed by host device 14. Each sector addressed by host device 14 may contain 512 bytes, 520 bytes, 524 bytes, 528 bytes, etc.

FIG. 3 depicts decompression portion 29 as containing one decompression sub-system 30. The subject technology is not limited to this configuration. For example, decompression portion 29 may include multiple decompression sub-systems 30 each configured to decompress respective compressed data transferred from memory 12. Multiple decompression sub-systems 30 may be used to match the data bandwidth at which host interface 15 is capable of sending data to host device 14. In this manner, decompression system 29 is capable of decompressing data sent to host device 14 on-the-fly with little or no impact on the rate at which the data can be read from within data storage system 10. For configurations having multiple decompression sub-systems 30, decompression portion 29 may include a sequencer configured to maintain the order of data that is distributed and decompressed in parallel by multiple decompression sub-systems 30.

FIG. 3 also depicts decompression portion 29 as containing a single decompression bypass buffer 31. The subject technology is not limited to this configuration. For example, decompression portion 29 may include multiple decompression bypass buffers 31 configured to receive respective data transferred from memory 12 that bypasses decompression sub-system 29.

Figure 4:
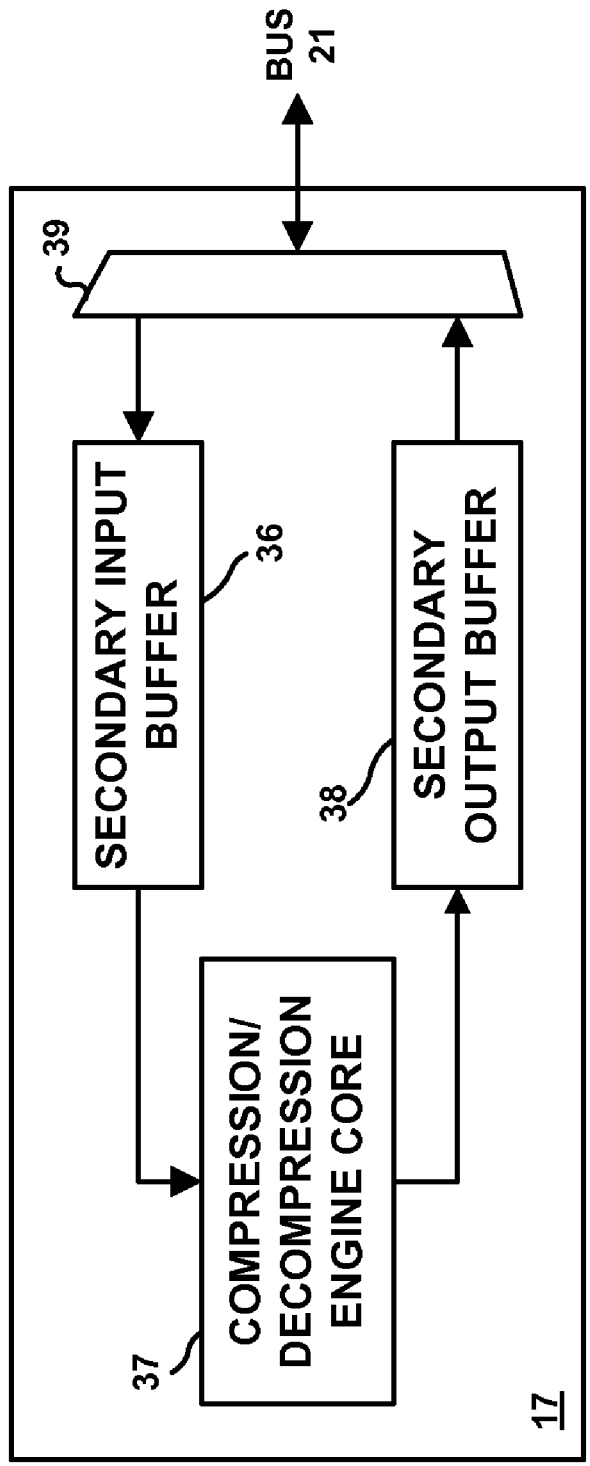
FIG. 4 is a block diagram illustrating components of a secondary compression/decompression engine according to one aspect of the subject technology.

FIG. 4 is a block diagram illustrating components of secondary compression/decompression engine 17 according to one aspect of the subject technology. Secondary compression/decompression engine 17 includes secondary input buffer 36, compression/decompression engine core 37, and secondary output buffer 38. Secondary compression/decompression engine 17 also may include multiplexer 39 and/or one or more DMA engines (not shown) configured to transfer data between memory 12 and secondary input buffer 36, and between secondary output buffer 38 and memory 12.

Secondary input buffer 36 is configured to store data transferred from memory 12. Secondary input buffer 36 may be a first-in/first-out (FIFO) buffer. Compression/decompression engine core 37 is configured to either compress data stored in secondary input buffer 36 and store the compressed data in secondary output buffer 38, or to decompress compressed data stored in secondary input buffer 36 and store the uncompressed data in secondary output buffer 38. Secondary output buffer 38 may be a first-in/first-out (FIFO) buffer. Secondary output buffer 38 is configured to store the data compressed or uncompressed by compression/decompression engine core 37 until it is transferred back to memory 12.

Similar to compression system 22 and decompression system 29, secondary compression/decompression engine 17 may be configured to work on one logical block of data at a time. Accordingly, each of secondary input buffer 36 and secondary output buffer 38 may have sufficient capacity to store at least one logical block of data. However, the subject technology does not require the capacity to be larger than one logical block of data. As discussed above, each logical block of data may contain multiple sectors addressed by host device 14. For example, each logical block of data may include two, four, eight, sixteen, thirty-two, etc. sectors of data addressed by host device 14. Each sector addressed by host device 14 may contain 512 bytes, 520 bytes, 524 bytes, 528 bytes, etc.

Secondary compression/decompression engine 17 may be used to compress and/or decompress data necessary to perform various tasks within data storage system 10. For example, when flash memory is used to implement storage medium 13, various housekeeping tasks are performed to maintain the data stored within the flash memory. The tasks may include read-modify-write operations, garbage collection operations, wear-leveling algorithms, etc. These housekeeping tasks may require compressed data stored in storage medium 13 to be temporarily decompressed in order to perform the housekeeping task and subsequently recompressed prior to being stored back in storage medium 13. These housekeeping tasks may be performed in the background of operations within data storage controller 11 without stopping the operation of primary compression/decompression engine 16.

As discussed above, compression portion 22 may be configured to operate on one logical block of data at a time. In the event that host device 14 sends less than one logical block of data for storage in data storage system 10, that data may initially bypass compression sub-system 23 via compression bypass buffer 24 and be stored in memory 12. Data storage controller 11 may accumulate such portions of data from multiple write commands until one or more logical blocks of data have been accumulated in memory 12. This accumulated data then may be compressed using secondary compression/decompression engine 17 prior to storing the compressed data in memory 12. This features allows primary compression/decompression engine 16 to operate at full capacity while secondary compression/decompression engine 17 takes care of compressing smaller amounts of data in the background.

In the arrangement described above, primary compression/decompression engine 16 represents a high-throughput engine relative to secondary compression/decompression engine 17 and secondary compression/decompression engine 17 represents a low-throughput engine relative to primary compression/decompression engine 16. The low-throughput engine is utilized within data storage system 10 to perform tasks not suited to keeping the high-throughput engine operating at full capacity. The operations of the low-throughput engine and the high-throughput engine may be performed in parallel further improving the performance of data storage system 10.

Each of compression engine core 26, decompression engine core 33, and compression/decompression engine core 37 are configured to compress/decompress data according to a compression algorithm. The compression algorithm is used to compress data being stored in data storage system 10 and to decompress the compressed data before it is read from data storage system 10. Accordingly, data storage system 10 is a closed system and the compression algorithm is transparent to host device 14.

The subject technology is not limited to any particular compression algorithm. According to one aspect of the subject technology, a GZIP compression algorithm may be used. The GZIP algorithm may uses a variation of LZ77 (Lempel-Ziv 1977 or LZ1) and Huffman encoding. This algorithm finds duplicated strings in the input data. A second occurrence of a string is replaced by a pointer to the previous string in the form of a distance/length pair. Literals and match lengths are compressed with one Huffman tree and match distances are compressed with another tree. The Huffman trees may be static or dynamic. Static trees are a set of standard encodings known a priori by both the compression and decompression algorithms. Dynamic trees provide higher compression ratios and are generated according to the data content. The data used to reconstruct dynamic Huffman trees are sent with the compressed data. Those skilled in the art will recognize that other compression algorithms may be used within data storage system 10 without departing from the scope of the subject technology.

Returning to FIG. 1, processor 18 is configured to monitor and control the operation of the components in data storage controller 11. Processor 18 is configured to execute code or instructions to perform the operations and functionality described herein. One or more sequences of instructions may be stored as firmware on ROM within processor 18 or data storage controller 11. One or more sequences of instructions may be software stored and read from memory 12, storage medium 13, or received from host device 14. ROM, memory 12, and storage medium 13 represent examples of machine or computer readable media on which instructions/code executable by processor 18 may be stored. Machine or computer readable media may generally refer to any medium or media used to provide instructions to processor 18, including both volatile media, such as dynamic memory used for memory 12 or for buffers within data storage controller 11, and non-volatile media, such as electronic media, optical media, and magnetic media.

Processor 18 may be implemented using one or more processors. Processor 18 may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Storage medium interface 19 is configured to be coupled to storage medium 13 for transferring data between storage medium 13 and memory 12 or components within data storage controller 11. Storage medium interface 19 may include both physical and electrical connections for communicating data, address, and control signals between storage medium 13 and data storage controller 11. The subject technology is not limited to any particular type of interface. For example, storage medium interface 19 may implement a fiber channel interface for coupling with one or more channels of flash memory devices or chips.

Memory interface 20 is configured to be coupled to memory 12 for transferring data between memory 12 and other components within data storage controller 11. Memory interface 20 may include both physical and electrical connections for communicating data, address, and control signals between memory 12 and data storage controller 11. As noted above, memory 12 may be implemented using different types of dynamic, volatile memory. Memory interface 20 is configured to support the type of memory used to implement memory 12.

Bus 21 represents a multi-port communications bus for communication data, address, and control signals between components within data storage controller 11. The subject technology is not limited to any particular type of bus. While storage medium interface 19 and memory interface 20 are depicted in FIG. 1 as being separate from bus 21, these components may be integral to bus 21.

The components of data storage controller 11 may be implemented using discrete components. Alternatively, one or more of the components may be combined into a single chip. According to one aspect of the subject technology, host interface 15, primary compression/decompression engine 16, secondary compression/decompression engine 17, processor 18, storage medium interface 19, memory interface 20, and bus 21 are all integrated into a single system on a chip.

Figure 5:
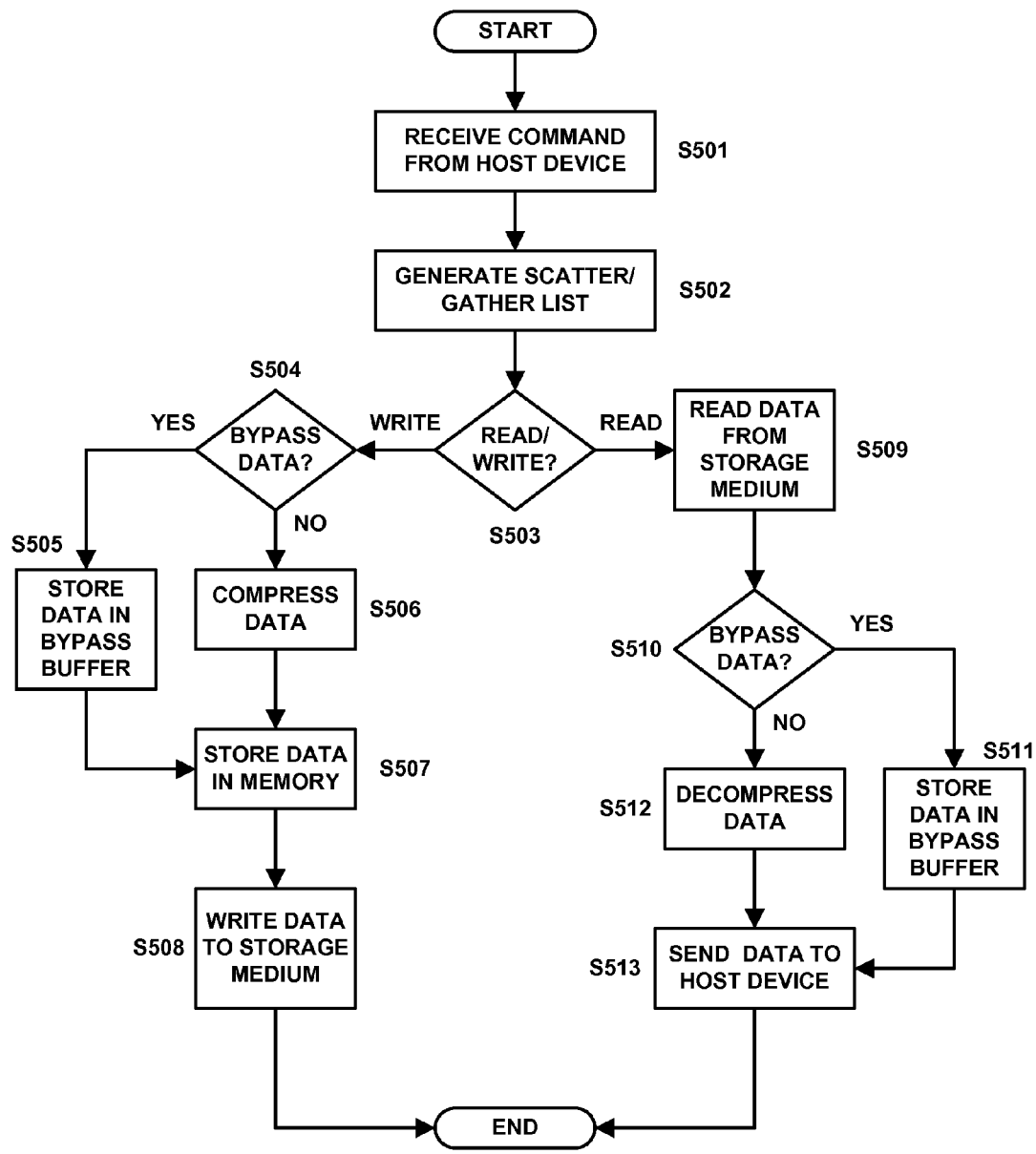
FIG. 5 is a flowchart illustrating a process for executing read and write commands received from a host device according to one aspect of the subject technology.
Figure 6:
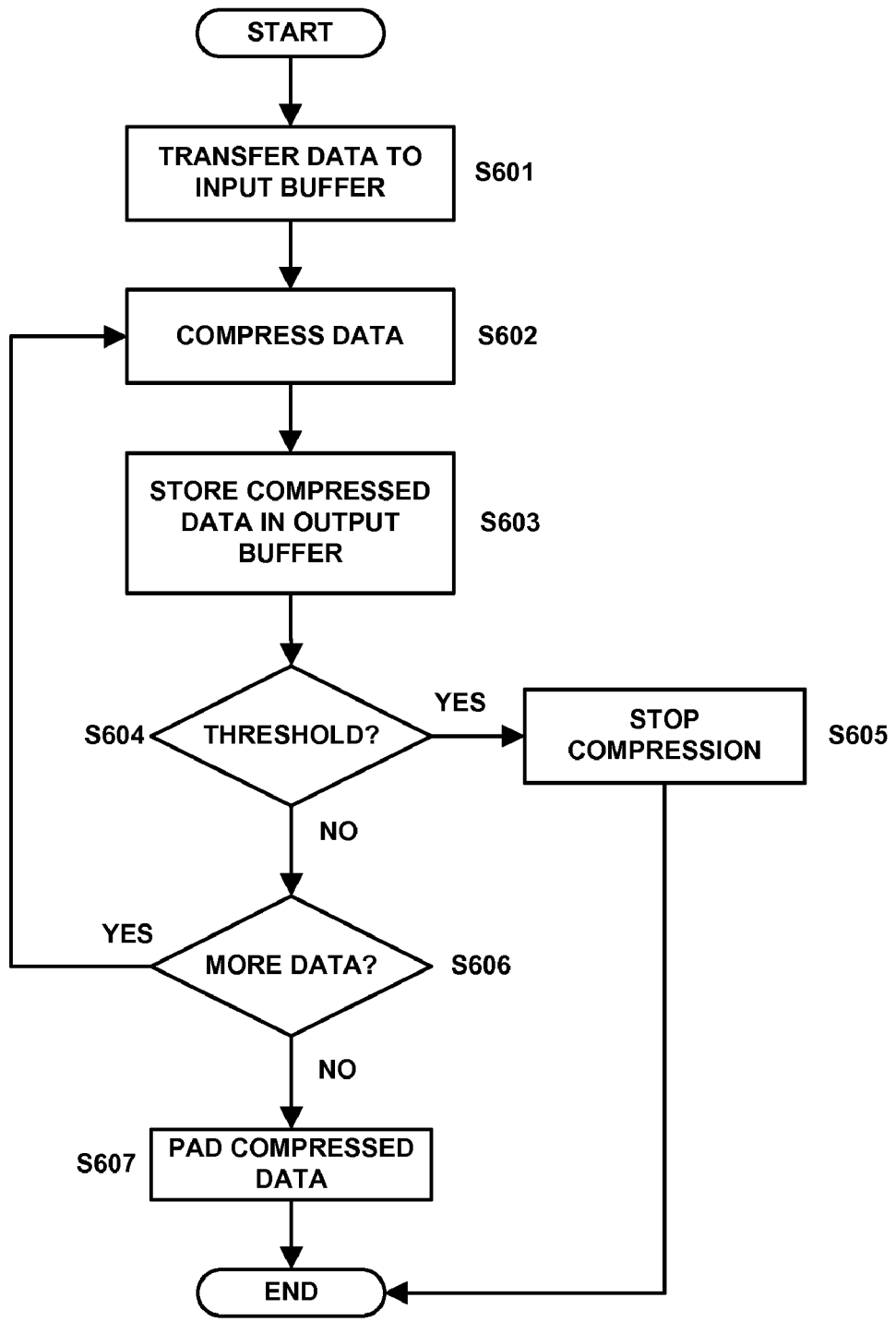
FIG. 6 is a flowchart illustrating a process for compressing data according to one aspect of the subject technology.

The operation of data storage system 10 will now be described in connection with the flowcharts provided in FIGS. 5 and 6. FIG. 5 is a flowchart illustrating a process for executing read/write commands received from host device 14 according to one aspect of the subject technology. FIG. 6 is a flowchart illustrating a process for compressing data according to one aspect of the subject technology.

The process in FIG. 5 begins in step S501 upon receiving a command from host device 14. Processor 18 may be alerted to the command based on an interrupt generated by host device 14 or host interface 15. Upon receiving the command, processor 18 decodes the command and begins executing one or sequences of instructions to carry out the command.

For a read or write command, processor 18 generates a scatter/gather list in step S502. The scatter/gather lists contains entries to instruct the transport layer within data storage controller 11 on where to place the associated data received from host device 14. For a write command, each entry will include the amount of associated data received from host device 14 and an address within memory 12 to store the data. Each entry in the scatter/gather lists also may include control information, including but not limited to indicating whether the data associated with the entry requires compression or not and whether the entry is the last entry in the current scatter/gather list. For read commands, each entry will include the uncompressed amount of associated data originally received from host device 14 as well as the size of the data after compression in addition to control information indicating whether the data read from memory 12 requires decompression and whether the entry is the last entry in the current scatter/gather list.

Once the scatter/gather list has been generated in step S502, processor 18 instructs the various components within data storage controller 11 on how to route the data associated with the received command. For example, processor 18 may instruct DMA engines in host interface 15 and primary compression/decompression engine 16 regarding the transfer of data from host interface 15 to primary compression/decompression engine 16, and from primary compression/decompression engine 16 to memory 12. The instructions for the various DMA engines may be issued by processor 18 in accordance with the various components completing the respective tasks described herein and setting flags or asserting signals read by processor 18 monitoring the operation.

The process diverges in step S503 depending on whether the command received from host device 14 is a read command or a write command. If it is a write command, the process proceeds to step S504 where it is determined if the data is to bypass being compressed or not. This determination may be made based on control information in the scatter/gather list entry corresponding to the data being processed. If the data is not to be compressed, host interface 15 stores the data in compression bypass buffer 24 in step S505. If the data is to be compressed, the process proceeds to step S506 where the data is compressed.

The process for compressing data illustrated in FIG. 6 begins in step S601 with host interface 15 storing the data in compression input buffer 25. As discussed above, compression sub-system 23 is configured to operate on one logical block of data at a time. Each entry in the scatter/gather lists may be associated with an amount of data equivalent to one logical block, which is stored in compression input buffer 25.

In step S602, compression engine core 26 begins compressing the data stored in compression input buffer 25. Compression engine core 26 operates on a sub-set of the logical block of data at a time to perform the compression algorithm. For example, compression engine 26 may load 4 bytes, 8 bytes, etc. from compression input buffer 25 at a time. As the data is compressed according to the compression algorithm, compression engine core 26 stores the compressed data in compression output buffer 27 in step S603.

According to one aspect of the subject technology, the data within one logical block may be organized into sectors having a different size than the host addressed sectors received from host device 14. For example, the data received from host device 14 may have been organized into 512 byte sectors. The compressed data stored in compression output buffer 27 may be organized into sectors having a different size such as 400 bytes, 520 bytes, 524 bytes, 528 bytes, etc. Allowing the sectors to be resized reduces or removes overhead processing that would otherwise be performed at a subsequent stage within data storage controller 11 in the event that storage medium 13 is organized into sectors having a different size than the host addressed sectors received from host device 14. The input sector size and the output sector size are set within data storage controller 11 as static values.

According to one aspect of the subject technology, the ability of the compression algorithm to compress the data is monitored and compression on a logical block of data is stopped when it is determined that the data cannot be sufficiently compressed. For example, assuming that one logical block of data contains eight sectors of data from host device 14, compression engine core 26 may stop compressing the logical block of data if the compression does not reduce the data below a set threshold. The threshold may be set at seven sectors of data, six sectors of data, etc. In step S604, the amount of compressed data stored in compression output buffer 27 is monitored and compared to the set threshold. If the threshold amount of compressed data is reached in step S604, compression engine core 26 stops compressing the data stored in compression input buffer in step S605. If the amount of compressed data stored in compression output buffer 27 has not reached the threshold amount, it is determined in step S606 whether all of the data stored in compression input buffer 25 has been compressed. If not, the process returns to step S602, where compression engine core 26 loads the next sub-set data for compression from compression input buffer 25.

If the entire logical block of data stored in compression input buffer 25, the process continues to step S607. According to one aspect of the subject technology, if the compressed data does not completely fill the last sector containing data, the last sector is padded with 1s or 0s to fill out the sector in step S607. Padding the data to file an entire sector helps reduce overhead later when the compressed data is stored in storage medium 13 by providing complete sectors for storing. When storage medium 13 comprises flash memory, whether the last sector is padded with 1s or 0s depends on the particular characteristics of the flash memory devices or chips used. For example, writing a 1 or a 0 may require more or less time and more or less power. Accordingly, the system can be configured to use the more efficient of the two values for padding the last sector of the compressed data. Once the compressed data has been padded the compression process ends.

Returning to FIG. 5, the data received from host device 14 is stored in memory 12 in step S507. This step may transfer the data from compression bypass buffer 24 if the data bypassed compression sub-system 23, or from compression output buffer 27 if the data compression completed, or from compression input buffer 25 if it was determined that the data cannot be sufficiently compressed and compression was halted. The transfer of the data for storage in memory 12 may be performed using one or more DMA engines in compression portion 22 in accordance with commands and parameters received from processor 18.

In step S508, the data is transferred from memory 12 for storage in storage medium 13. The subject technology is not limited to any particular management system for arranging and managing the data within storage medium 13. Those skilled in the art will recognize a number of different management systems that may be implemented by data storage controller 11 for storing and maintaining the data in storage medium 13. For example, flash memory and the reading and writing of data therein may be managed using different wear-leveling mechanisms.

If it is determined in step S503 that the command received from host device 14 is a read command, the process proceeds to step S509 where data corresponding to the read command is read from storage medium 13. The location of the data within storage medium 13 is determined based on mapping tables tracking the locations of logically addressed data received from host device 14 to the physical addresses of the data within storage medium 13. These mapping tables are updated as data is written to storage medium 13 and may include additional information to account for the compression of the data before being stored in storage medium 13. For example, the mapping table would have to track the lesser amount of data associated with a particular address due to the compression of that data.

In step S510, the scatter/gather list entry for the data is referenced to determine if the data requires decompression before being sent to host device 14. If the data does not require decompression, the data is transferred from memory 12 to decompression bypass buffer 31 in step S511. If the data requires decompression before being sent to host device 14, the compressed data is transferred from memory 12 to decompression input buffer 32 and decompression is performed in step S512 by decompression engine core 33.

Decompression of compressed data is performed in a similar manner to the compression process described above. For example, decompression engine core 33 loads a sub-set of the compressed data stored in decompression buffer 32 and performs decompression in accordance with the compression algorithm used to compress the data. As the data is decompressed, it is stored in decompression output buffer 34. This process continues until all of the data stored in decompression input buffer 32 is decompressed and stored in decompression output buffer 34. Meanwhile, data can be read from decompression output buffer 34 and sent to host interface 15 while decompression is in progress.

In step S513, data associated with the read command is sent to host device 14 via host interface 15. If the requested data did not require decompression, the data is transferred from decompression bypass buffer 31 to host interface 15. If the data did require decompression, the data is transferred from decompression output buffer 34 to host interface 15. The transfer of this data may be performed by DMA engines within host interface 15 in accordance with commands and parameters provided by processor 18.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage system comprising:
    a host interface configured to be coupled to a host device, to receive data from the host device, and to send data to the host device;
    a memory;
    a primary compression engine coupled to the host interface and to the memory, wherein the primary compression engine is configured to compress data received from the host device via the host interface and to store the data compressed by the primary compression engine in the memory, and wherein the primary compression engine is further configured to decompress compressed data stored in the memory prior to the data decompressed by the primary compression engine being sent to the host device via the host interface;
    a secondary compression engine coupled to the memory, wherein the secondary compression engine is configured to compress only data received from the memory and to store the data compressed by the secondary compression engine back in the memory, wherein the secondary compression engine is further configured to decompress only compressed data received from the memory and to store the data decompressed by the secondary compression engine back in the memory, and wherein the data compressed by the secondary compression engine comprises at least a portion of the data decompressed by the secondary compression engine;
    a non-volatile storage medium; and
    a processor configured to transfer compressed data from the memory to the non-volatile storage medium in response to a write command received from the host device and to transfer compressed data from the non-volatile storage medium to the memory in response to a read command received from the host device.

2. The data storage system according to claim 1, wherein the primary compression engine comprises:
    a compression sub-system configured to compress a logical unit of data received from the host device; and
    a compression bypass buffer configured to store data received from the host device indicated by the processor not to be compressed,
    wherein the primary compression engine is further configured to transfer data from the compression bypass buffer to the memory without passing the data through the compression sub-system.

3. The data storage system according to claim 2, wherein the compression sub-system comprises:
    a compression input buffer configured to store the logical unit of data received from the host device;
    a compression engine core configured to compress the logical unit of data stored in the compression input buffer; and
    a compression output buffer configured to store the compressed logical unit of data.

4. The data storage system according to claim 3, wherein the compression engine core is further configured to pad the compressed logical unit of data to a data unit boundary.

5. The data storage system according to claim 3, wherein the compression engine core is further configured to stop compressing the logical unit of data when an amount of compressed data generated from the logical unit of data by the compression engine core exceeds a threshold.

6. The data storage system according to claim 2, wherein the primary compression engine comprises a plurality of compression sub-systems, each compression sub-system configured to compress a respective logical unit of data received from the host device.

7. The data storage system according to claim 1, wherein the data received from the host device is organized into a first plurality of sectors having a first sector size, and
    wherein the primary compression engine is further configured to organize the compressed data into a second plurality of sectors having a second sector size.

8. The data storage system according to claim 1, wherein the primary compression engine comprises:
    a decompression sub-system configured to decompress compressed data transferred from the memory; and
    a decompression bypass buffer configured to store data transferred from the memory indicated by the processor as being uncompressed, wherein the host interface is configured to transfer data stored in the decompression bypass buffer to the host device without passing the data through the decompression sub-system.

9. The data storage system according to claim 8, wherein the decompression sub-system comprises:
  a decompression input buffer configured to store the compressed data transferred from the memory;
  a decompression engine core configured to decompress the compressed data stored in the decompression input buffer; and
  a decompression output buffer configured to store the decompressed data.

10. The data storage system according to claim 8, wherein the primary compression engine comprises a plurality of decompression sub-systems, each decompression sub-system configured to decompress respective units of data transferred from the memory.

11. A data storage controller comprising:
  a host interface configured to be coupled to a host device, to receive data from the host device, and to send data to the host device;
  a memory interface configured to be coupled to a memory;
  a primary compression engine coupled to the host interface and to the memory interface, wherein the primary compression engine is configured to compress data received from the host device via the host interface and to store the data compressed by the primary compression engine in the memory via the memory interface, and wherein the primary compression engine is further configured to decompress compressed data received from the memory via the memory interface prior to the data decompressed by the primary compression engine being sent to the host device via the host interface;
  a secondary compression engine coupled to the memory interface, wherein the secondary compression engine is configured to compress only data received from the memory via the memory interface and to store the data compressed by the secondary compression engine back in the memory via the memory interface, wherein the secondary compression engine is further configured to decompress only compressed data received from the memory via the memory interface and to store the data decompressed by the secondary compression engine back in the memory via the memory interface, and wherein the data compressed by the secondary compression engine comprises at least a portion of the data decompressed by the secondary compression engine;
  a non-volatile storage medium interface; and
  a processor configured to transfer compressed data from the memory via the memory interface to the non-volatile storage medium via the non-volatile storage medium interface in response to a write command received from the host device via the host interface and to transfer compressed data from the non-volatile storage medium via the non-volatile storage medium interface to the memory via the memory interface in response to a read command received from the host device via the host interface.

12. The data storage controller according to claim 11, wherein the primary compression engine comprises:
  a compression sub-system configured to compress a logical unit of data received from the host device; and
  a compression bypass buffer configured to store data received from the host device indicated by the processor not to be compressed,
  wherein the primary compression engine is further configured to transfer data from the compression bypass buffer to the memory without passing the data through the compression sub-system.

13. The data storage controller according to claim 12, wherein the compression sub-system comprises:
  a compression input buffer configured to store the logical unit of data received from the host device;
  a compression engine core configured to compress the logical unit of data stored in the compression input buffer; and
  a compression output buffer configured to store the compressed logical unit of data.

14. The data storage controller according to claim 13, wherein the compression engine core is further configured to pad the compressed logical unit of data to a data unit boundary.

15. The data storage controller according to claim 13, wherein the compression engine core is further configured to stop compressing the logical unit of data when an amount of compressed data generated from the logical unit of data by the compression engine core exceeds a threshold.

16. The data storage controller according to claim 12, wherein the primary compression engine comprises a plurality of compression sub-systems, each compression sub-system configured to compress a respective logical unit of data received from the host device via the host interface.

17. The data storage controller according to claim 11, wherein the data received from the host device is organized into a first plurality of sectors having a first sector size, and
  wherein the primary compression engine is further configured to organize the compressed data into a second plurality of sectors having a second sector size.

18. The data storage controller according to claim 11, wherein the primary compression engine comprises:
  a decompression sub-system configured to decompress compressed data transferred from the memory via the memory interface; and
  a decompression bypass buffer configured to store data transferred from the memory indicated by the processor as being uncompressed,
  wherein the host interface is configured to transfer data stored in the decompression bypass buffer to the host device without passing the data through the decompression sub-system.

19. The data storage controller according to claim 8, wherein the decompression sub-system comprises:
  a decompression input buffer configured to store the compressed data transferred from the memory via the memory interface;
  a decompression engine core configured to decompress the compressed data stored in the decompression input buffer; and
  a decompression output buffer configured to store the decompressed data.

20. The data storage system according to claim 18, wherein the primary compression engine comprises a plurality of decompression sub-systems, each decompression sub-system configured to decompress respective units of data transferred from the memory via the memory interface.

21. A data storage system comprising:
  a host interface configured to be coupled to a host device, to receive data from the host device, and to send data to the host device;
  a memory;
  a primary compression engine comprising:
    a plurality of compression sub-systems configured to compress respective logical units of data received from the host device via the host interface and to store the data compressed by the plurality of compression sub-systems in the memory;
    a compression bypass buffer configured to store data received from the host device indicated not to be compressed, wherein the primary compression engine is configured to transfer data from the compression bypass buffer to the memory without passing the data through the plurality of compression sub-systems;

a plurality of decompression sub-systems configured to decompress compressed data transferred from the memory;

a decompression bypass buffer configured to store data transferred from the memory indicated as being uncompressed, wherein the host interface is configured to transfer data stored in the decompression bypass buffer to the host device without the data passing through the plurality of decompression sub-systems;

a secondary compression engine coupled to the memory, wherein the secondary compression engine is configured to compress only data received from the memory and to store the data compressed by the secondary compression engine back in the memory, wherein the secondary compression engine is further configured to decompress only compressed data received from the memory and to store the data decompressed by the secondary compression engine back in the memory, and wherein the data compressed by the secondary compression engine comprises the data transferred from the compression bypass buffer to the memory without passing through the plurality of compression sub-systems;

a non-volatile storage medium; and a processor configured to transfer compressed data from the memory to the non-volatile storage medium in response to a write command received from the host device and to transfer compressed data from the non-volatile storage medium to the memory in response to a read command received from the host device.

* * * * *